United States Patent
Imazeki (10) Patent No.: US 11,958,561 B2
(45) Date of Patent: Apr. 16, 2024

(54) STRADDLED VEHICLE

(71) Applicant: YAMAHA HATSUDOKI KABUSHIKI KAISHA, Iwata (JP)

(72) Inventor: Souichirou Imazeki, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 75 days.

(21) Appl. No.: 17/561,289

(22) Filed: Dec. 23, 2021

(65) Prior Publication Data
US 2022/0204108 A1  Jun. 30, 2022

(30) Foreign Application Priority Data

Dec. 29, 2020  (JP) ................................ 2020-219791

(51) Int. Cl.
*B62J 17/10* (2020.01)
*B62J 17/02* (2006.01)
*B62J 17/086* (2020.01)

(52) U.S. Cl.
CPC ............... *B62J 17/10* (2020.02); *B62J 17/02* (2013.01); *B62J 17/086* (2020.02)

(58) Field of Classification Search
CPC . B62J 17/10; B62J 17/02; B62J 17/086; B62J 40/10
See application file for complete search history.

(56) References Cited

U.S. PATENT DOCUMENTS

| 8,631,888 B2* | 1/2014 | Iida ........................... B62J 17/10 180/68.1 |
| 9,334,005 B2* | 5/2016 | Horiuchi ................. B62K 19/46 |
| 9,834,268 B2* | 12/2017 | Tanabe ..................... B62J 17/04 |

(Continued)

FOREIGN PATENT DOCUMENTS

| EP | 3599148 A1 * | 1/2020 | ............. B62J 17/10 |
| JP | 5204048 B2 * | 6/2013 | |

(Continued)

OTHER PUBLICATIONS https://www.amazon.com/UltraSupplier-Aerodynamic-Protection-Motorcycle-Accessories/dp/B07XBJ9RQR?th=1 Author: UltraSupplier Title: Motorcycle Front Winglet Dynamic Side Wing Kit (Year: 2016).*

*Primary Examiner* — Amy R Weisberg
*Assistant Examiner* — Sara Laghlam
(74) *Attorney, Agent, or Firm* — Rabin & Berdo, P.C.

(57) ABSTRACT

A straddled vehicle having a body frame including a head pipe, a front cover disposed in front of the head pipe, a duct disposed in front of the head pipe and extending rearward from an opening in the front cover, to thereby form a traveling wind pathway for traveling wind taken in through the opening, and an aero-stabilizing member. The aero-stabilizing member includes a middle portion disposed below a lower distal end of the front cover, directly below the opening in a front view, a lateral portion extending from the middle portion to a more outer side than the opening in a width direction, apart from the front cover with a gap therebetween in an up-and-down direction, and a front edge slanted forward and downward from the middle portion and the lateral portion, the front edge being partially disposed further forward than a lower front end of the duct.

6 Claims, 9 Drawing Sheets

(56) References Cited

U.S. PATENT DOCUMENTS

| | | | |
|---|---|---|---|
| 2014/0203594 A1* | 7/2014 | Tsukui | B60J 1/02 |
| | | | 296/192 |
| 2015/0083512 A1* | 3/2015 | Maeda | B62J 17/00 |
| | | | 180/219 |
| 2017/0166277 A1* | 6/2017 | Konno | B62K 25/283 |
| 2018/0237094 A1* | 8/2018 | Fischer | B62J 27/20 |
| 2020/0158056 A1* | 5/2020 | Miki | B62K 19/30 |
| 2022/0204109 A1* | 6/2022 | Kawabata | B62K 11/14 |
| 2023/0073889 A1* | 3/2023 | Martin | B62J 17/00 |

FOREIGN PATENT DOCUMENTS

| | | | | |
|---|---|---|---|---|
| JP | 2015-227103 A | 12/2015 | | |
| WO | WO-2020030749 A1 * | 2/2020 | | B60K 11/04 |

\* cited by examiner

STRADDLED VEHICLE

CROSS-REFERENCE TO RELATED APPLICATIONS

This application is based on, and claims priority from, Japanese Patent Application No. 2020-219791, filed on Dec. 29, 2020. The contents of the application is incorporated herein by reference.

BACKGROUND

Field of the Invention

The present invention relates to a straddled vehicle.

Background Information

In a type of straddled vehicle well-known so far, a front cover is provided with an opening for taking in traveling wind, flowing from ahead of the vehicle, into a duct. For example, Japan Laid-open Patent Application Publication No. 2015-227103 discloses a straddled vehicle, in which the traveling wind, taken in through the opening into the duct, is led to an air cleaner through an air intake pathway.

SUMMARY

In attempt to generate a downforce in the straddled vehicle that the front cover is provided with the opening to take in the traveling wind, it can be assumed to provide wing-shaped aero-stabilizing fins and/or so forth on lateral portions of the vehicle. In this case, it is concerned that the vehicle is not only complicated in structure but is also increased in size.

It is an object of the present invention to generate a downforce with a simple configuration.

A straddled vehicle according to an aspect of the present invention includes a vehicle body frame, a front cover, a duct, and an aero-stabilizing member. The vehicle body frame includes a head pipe. The front cover is disposed in front of the head pipe. The duct is disposed in front of the head pipe. The duct includes an opening and a traveling wind pathway. The opening is provided in the front cover and takes in traveling wind flowing from ahead. The traveling wind pathway extends rearward from the opening. The aero-stabilizing member configured to generate a downforce by utilizing the traveling wind flowing from ahead. The aero-stabilizing member includes a middle portion, a lateral portion, and a front edge. The middle portion is disposed in a lower portion of a distal end of the front cover and is also disposed directly below the opening in a vehicle front view. The lateral portion extends from the middle portion to a more outer side than the opening in the vehicle width direction and is disposed apart from the front cover at a gap in a vehicle up-and-down direction. The front edge has a shape shaped slanted forward and downward. The front edge is partially disposed on a more front side than a lower end of the opening.

In the straddled vehicle according to the present aspect, the front edge of the aero-stabilizing member is shaped to slant down forward. Therefore, the traveling wind flowing from ahead hits the aero-stabilizing member, whereby a downforce is generated. Because of this, the straddled vehicle can obtain a downforce with a simple and compact configuration in comparison with, for instance, a configuration that a vehicle is provided with wing-shaped aero-stabilizing fins and/or so forth on lateral portions thereof so as to generate a downforce. Besides, the lateral portion of the aero-stabilizing member is disposed apart from the front cover at the gap in the vehicle up-and-down direction. Hence, the traveling wind hits the lateral portion, whereby a downforce can be herein obtained as well. Moreover, the aero-stabilizing member is configured to be disposed in a front portion of the vehicle, i.e., a position in which air pressure is high. Hence, a greater downforce can be herein obtained than a configuration that the aero-stabilizing member is disposed in any other position. Furthermore, the front edge of the aero-stabilizing member is partially disposed on a more front side than the lower end of the opening. Hence, the traveling wind is stabilized by the aero-stabilizing member and becomes likely to be led to the opening. Consequently, the amount of wind passing through the duct can be increased.

The aero-stabilizing member may be attached to the front cover in detachable manner. In this case, replacement of the aero-stabilizing member can be made easy. Besides, the aero-stabilizing member can be replaced to another suitable for a traveling course. Hence, the amount of downforce can be easily changed.

The straddled vehicle may further include a front fork and a front wheel. The front fork is supported by the head pipe so as to be turnable. The front wheel is supported by the front fork so as to be rotatable. The aero-stabilizing member may be disposed on a more front side than an axle of the front wheel. In this case, a load can be actively applied to a front wheel by the downforce obtained by the aero-stabilizing member.

The lower end of the opening may be disposed on a more rear side than an upper end of the opening. The middle portion of the aero-stabilizing member may be disposed in front of the lower end of the opening, and simultaneously, may be disposed such that a rear end thereof adjoins the lower end of the opening. In this case, the traveling wind becomes more likely to be led to the duct by the middle portion. Besides, the front edge located in the middle portion composes a portion of the opening. Hence, the area of the opening can be increased.

The middle portion may be disposed to protrude to a more front side than the lateral portion and may be provided with at least one rib on a lower surface thereof. In this case, the middle portion of the aero-stabilizing member, on which a large load acts due to air pressure, can be reinforced by the at least one rib.

The front cover may include an engaging portion engaged with the at least one rib so as to position the aero-stabilizing member with respect to the front cover. In this case, positioning of the aero-stabilizing member can be made easy by the at least one rib.

DETAILED DESCRIPTION OF EMBODIMENTS

A preferred embodiment of a straddled vehicle according to an aspect of the present invention will be hereinafter explained with reference to drawings. It should be noted that in the following explanation, terms indicating such directions as "back and forth", "up and down", and "right and left" are explained based on directions seen from a rider in operation of the straddled vehicle. Therefore, a right-and-left direction is synonymous with a vehicle width direction. Besides, the term "outer side in a vehicle width direction" means a side far from the center of the straddled vehicle in the vehicle width direction. By contrast, the term "inner side in the vehicle width direction" means a side near to the center of the straddled vehicle in the vehicle width direction.

Figure 1:
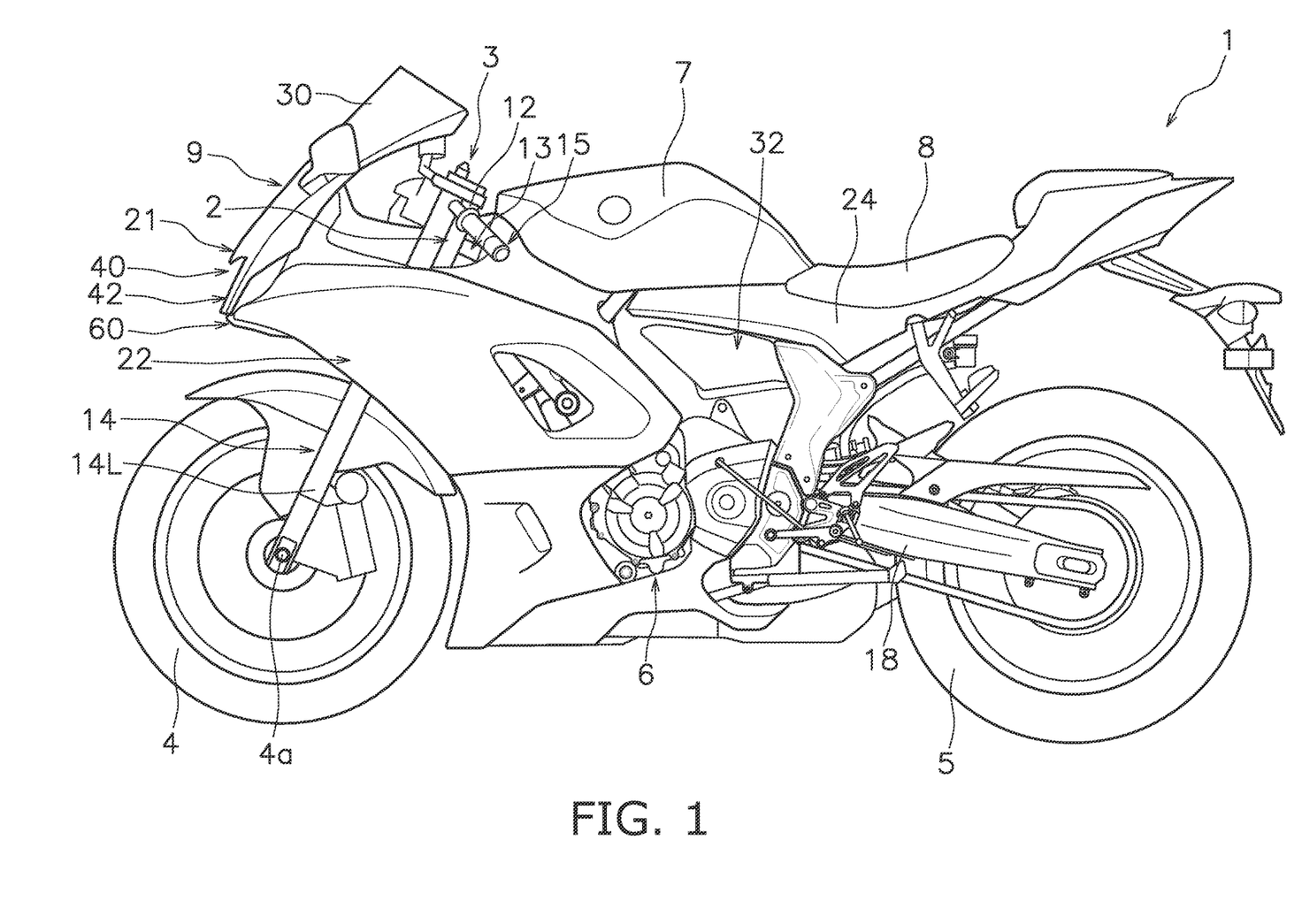
FIG. 1 is a left side view of a straddled vehicle.

FIG. 1 is a left side view of a straddled vehicle 1. The straddled vehicle 1 includes a vehicle body frame 2, a steering device 3, a front wheel 4, a rear wheel 5, an engine 6, a fuel tank 7, a seat 8, and a vehicle body cover 9.

The vehicle body frame 2 includes a head pipe 12 and a main frame 13. The head pipe 12 extends forward and downward from the upper end thereof to the lower end thereof in a vehicle side view. The head pipe 12 is disposed in the middle of the vehicle in the vehicle width direction.

The main frame 13 is connected to the head pipe 12 and extends therefrom rearward. It should be noted that the term "connection" is not limited to direct connection and encompasses indirect connection. Besides, the term "connection" is not limited to a condition that separate members are fixed to each other and encompasses a condition that a plurality of portions in an integrated member continue to each other.

Figure 2:
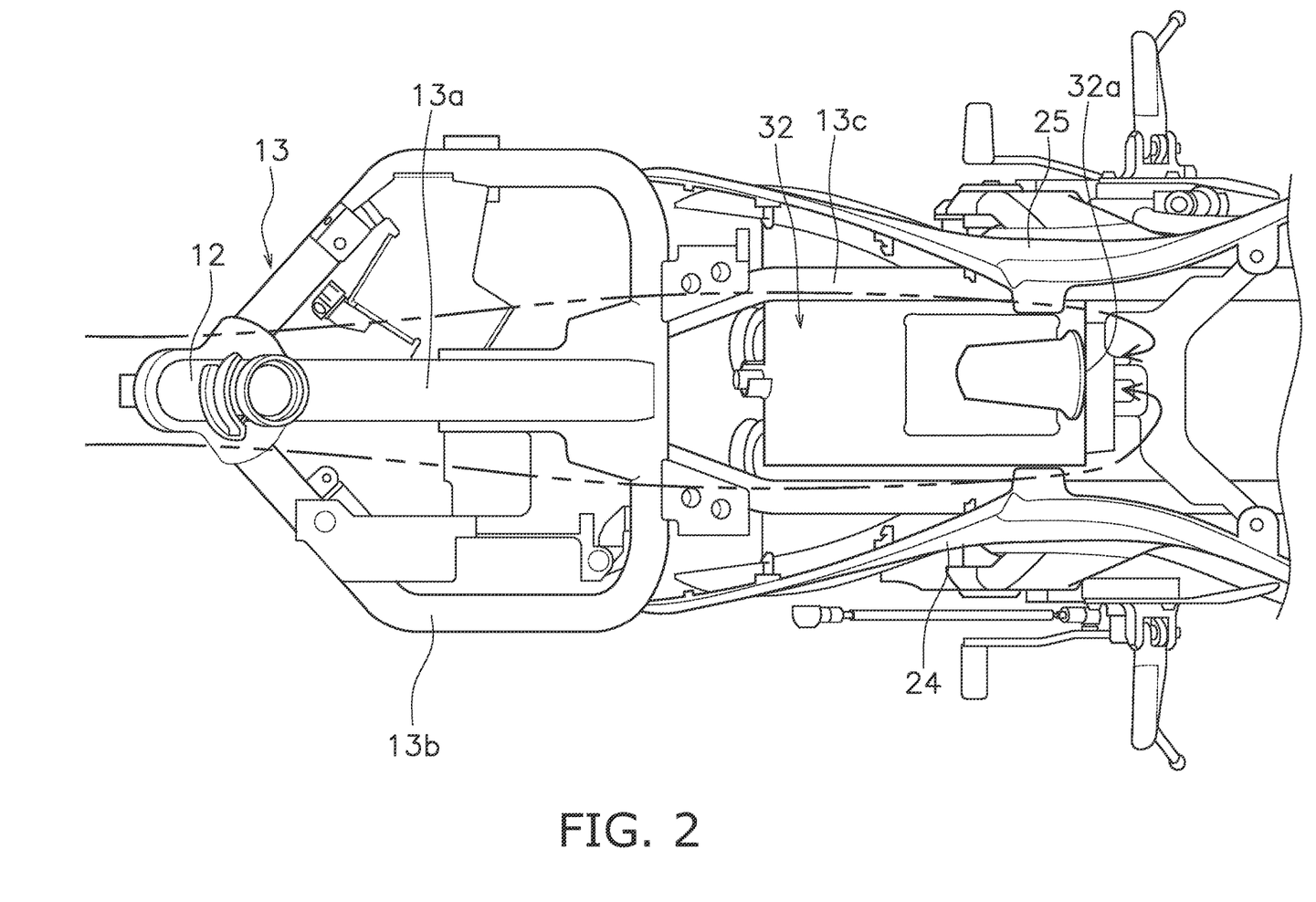
FIG. 2 is a view of a vehicle body frame and the surroundings thereof as seen from above.

FIG. 2 is a view of the vehicle body frame 2 and the surroundings thereof as seen from above. FIG. 2 omits illustration of the engine 6, the fuel tank 7, the seat 8, and so forth. The main frame 13 includes a tank support frame 13a, an engine support frame 13b, and a rear frame 13c.

The tank support frame 13a extends rearward from the head pipe 12. The tank support frame 13a is disposed directly below the fuel tank 7 in the vehicle middle in the vehicle width direction and supports the fuel tank 7. The engine support frame 13b is disposed on a lower side than the tank support frame 13a. The engine support frame 13b extends rearward from the head pipe 12, while branching therefrom right and left. The engine support frame 13b is connected at the branched rear ends thereof to the rear end of the tank support frame 13a. The rear frame 13c extends rearward from the rear end of the tank support frame 13a, while branching therefrom right and left.

Figure 3:
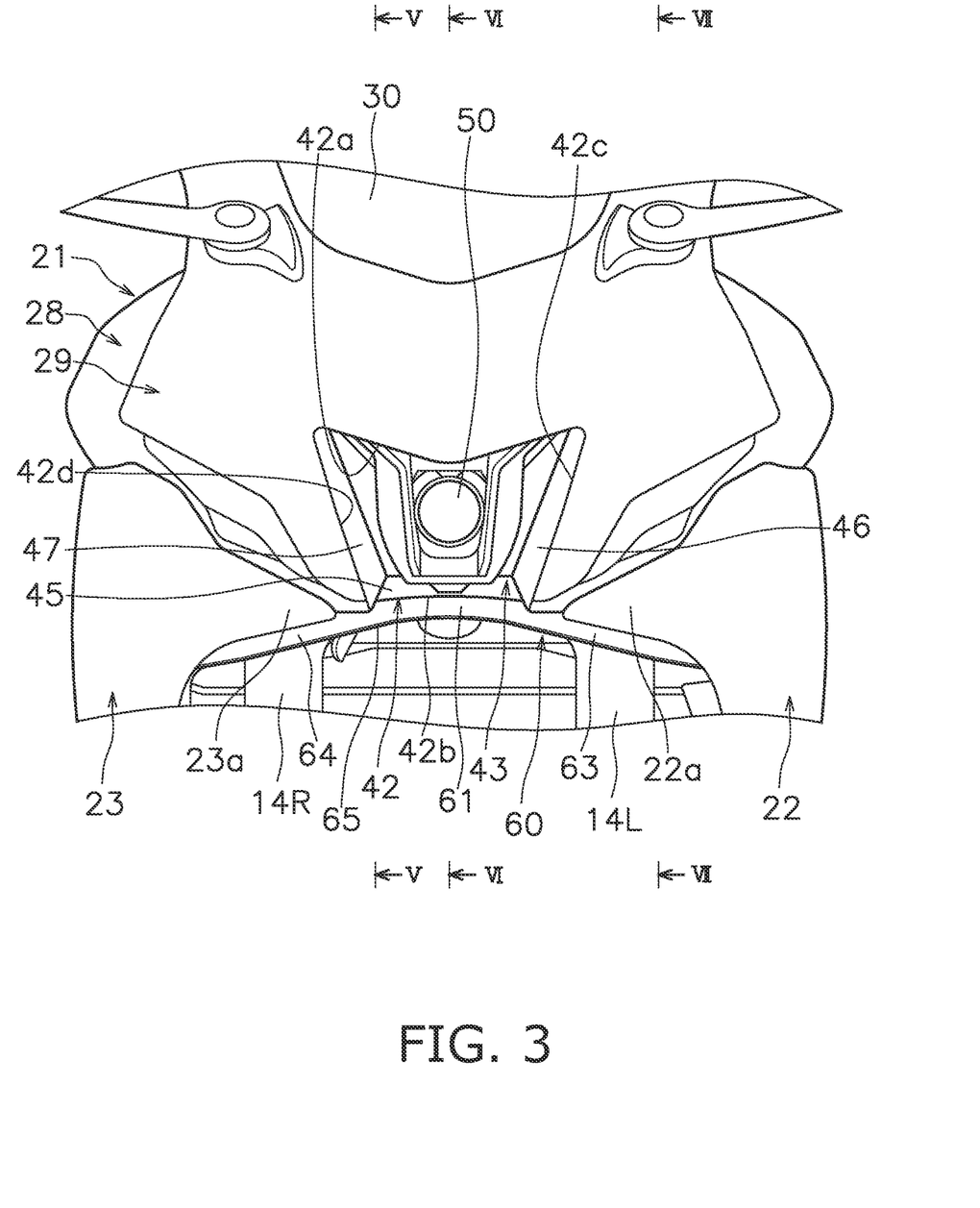
FIG. 3 is a partial front view of the straddled vehicle.

The steering device 3 includes a front fork 14 and a handle portion 15. The front fork 14 is supported by the head pipe 12 so as to be turnable. FIG. 3 is a partial front view of the straddled vehicle 1. The front fork 14 includes a pair of right and left front suspensions 14R and 14L. The pair of right and left front suspensions 14R and 14L extends forward and downward from the upper ends thereof to the lower ends thereof in the vehicle side view. The handle portion 15 is fixed to an upper portion of the front fork 14.

The front wheel 4 is supported by the front fork 14 so as to be rotatable. The front wheel 4 is coupled to the lower ends of the pair of right and left front suspensions 14R and 14L. The rear wheel 5 is supported by a swing arm 18 disposed behind the engine 6 so as to be rotatable.

The engine 6 is supported by the vehicle body frame 2. The engine 6 is attached to the engine support frame 13b of the main frame 13. The engine 6 is disposed directly below the fuel tank 7.

The fuel tank 7 is disposed behind the head pipe 12. The fuel tank 7 is disposed directly above the tank support frame 13a and the rear frame 13c.

The seat 8 is disposed behind the fuel tank 7. The seat 8 is disposed directly above the rear frame 13c and is supported by the rear frame 13c.

The vehicle body cover 9 includes a front cover 21, front side covers 22 and 23, and rear side covers 24 and 25.

The front cover 21 is disposed in front of the head pipe 12. The front cover 21 is disposed in the vehicle middle in the vehicle width direction.

Figure 4:
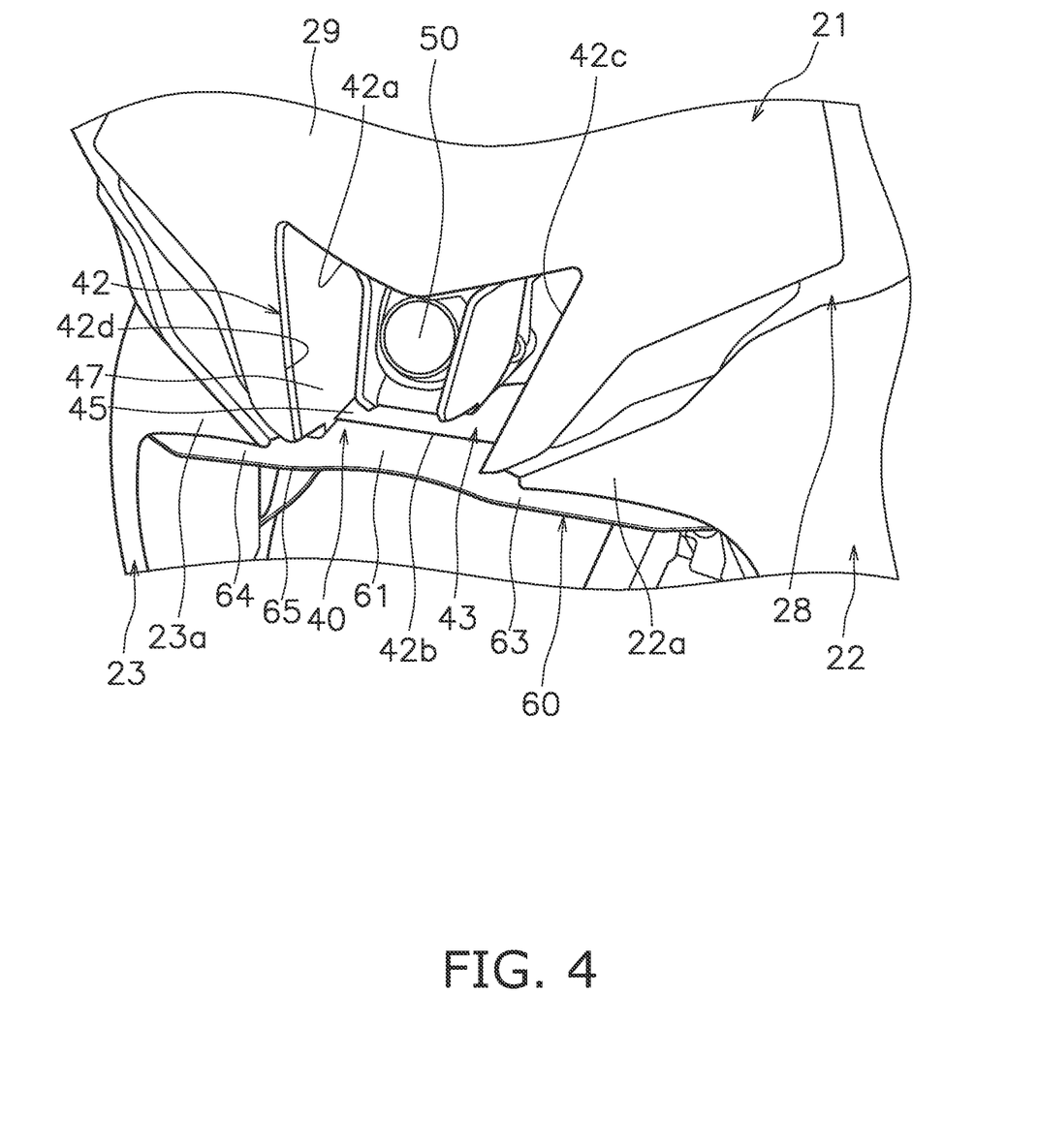
FIG. 4 is a perspective view of a front cover and the surroundings thereof.

FIG. 4 is a perspective view of the front cover 21 and the surroundings thereof. The front cover 21 includes a cover body 28 and an outer cover 29. The outer cover 29 is disposed in front of the cover body 28. The outer cover 29 is fixed to the cover body 28 so as to cover a portion of the cover body 28 from front. A wind shield 30 is attached to an upper portion of the outer cover 29.

The front side cover 22 is disposed on the left side of the vehicle middle in the vehicle width direction. The front side cover 22 laterally covers a portion of the front fork 14 from left. The front side cover 22 extends to a position located directly below the fuel tank 7 in the vehicle side view. The front side cover 22 includes a front end 22a. The front end 22a extends in the vehicle width direction in a vehicle front view. The front end 22a is disposed directly below the outer cover 29 and is fixed to the cover body 28 so as to cover a left lower portion of the cover body 28 from front.

The front side cover 23 is shaped to be bilaterally symmetric to the front side cover 22. The front side cover 23 is disposed on the right side of the vehicle middle in the vehicle width direction. The front side cover 23 laterally covers a portion of the front fork 14 from right. The front side cover 23 includes a front end 23a. The front end 23a is fixed to the cover body 28 so as to cover a right lower portion of the cover body 28 from front.

As shown in FIG. 1, the rear side cover 24 is disposed behind the front side cover 22. The rear side cover 24 is disposed directly below the fuel tank 7 and the seat 8 in the vehicle side view. The rear side cover 24 laterally covers the rear frame 13c from left.

The rear side cover 25 is shaped to be bilaterally symmetric to the rear side cover 24. The rear side cover 24 laterally covers the rear frame 13c from right.

The straddled vehicle 1 further includes an air cleaner 32. The air cleaner 32 is disposed behind the front side cover 22 in the vehicle side view. The air cleaner 32 is disposed directly below the rear side cover 24 in the vehicle side view.

The air cleaner 32 is disposed directly below the fuel tank 7 and the rear frame 13c. The air cleaner 32 is connected to the engine 6. The air cleaner 32 includes an air intake port 32a opened rearward. The air intake port 32a is disposed behind the tank support frame 13a.

As shown in FIGS. 3 and 4, the straddled vehicle 1 further includes a duct 40, a headlight 50, and an aero-stabilizing member 60. The duct 40 is disposed in front of the head pipe 12. The duct 40 includes an opening 42 and a traveling wind pathway 43. The opening 42 takes in traveling wind flowing from ahead. The opening 42 is provided in the front cover 21. The opening 42 is provided in the distal end of the front cover 21 in the vehicle middle in the vehicle width direction. The opening 42 is opened forward.

The opening 42 has an approximately isosceles trapezoidal shape in the vehicle front view. The opening 42 includes an upper end 42a, a lower end 42b, a left lateral end 42c, and a right lateral end 42d.

Figure 5:
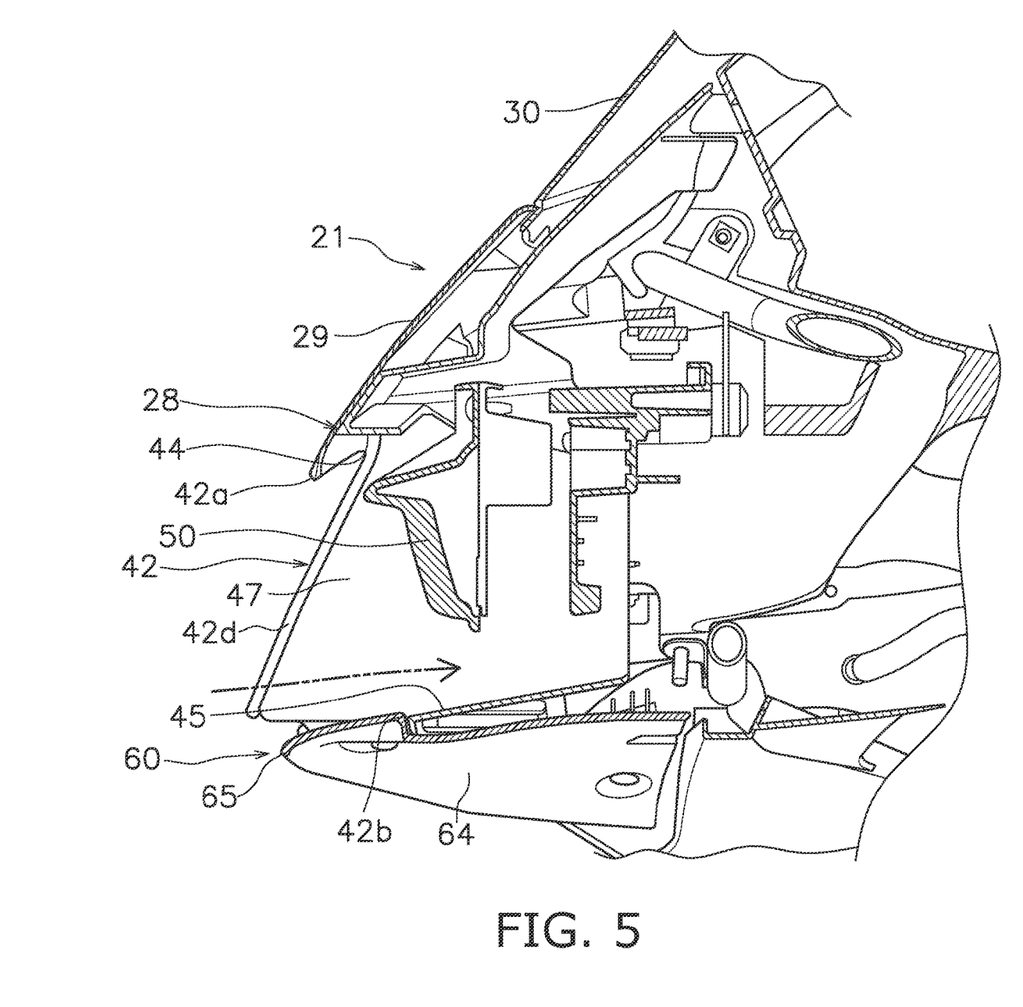
FIG. 5 is a cross-sectional view taken along line V-V in FIG. 3.
Figure 6:
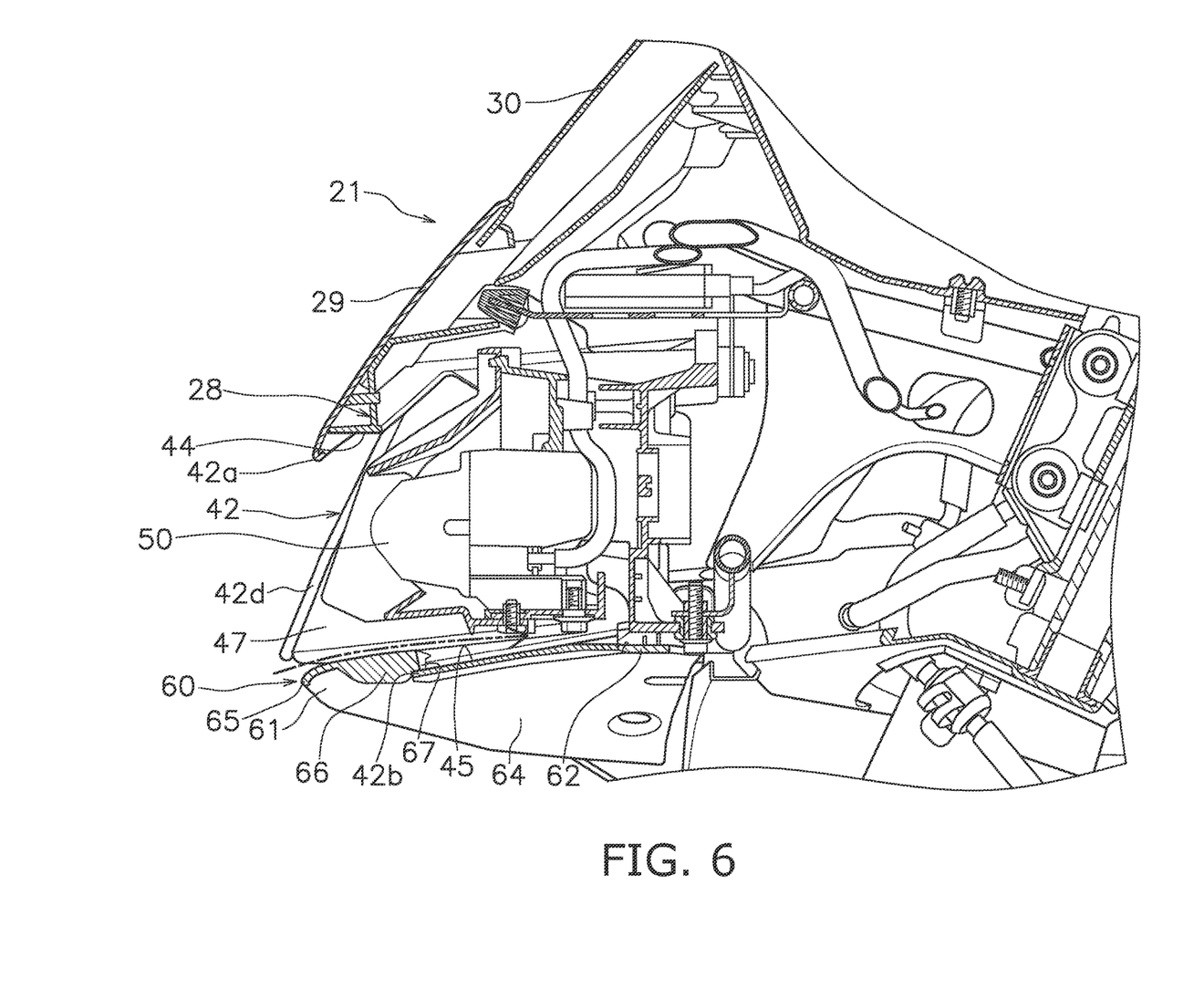
FIG. 6 is a cross-sectional view taken along line VI-VI in FIG. 3.
Figure 7:
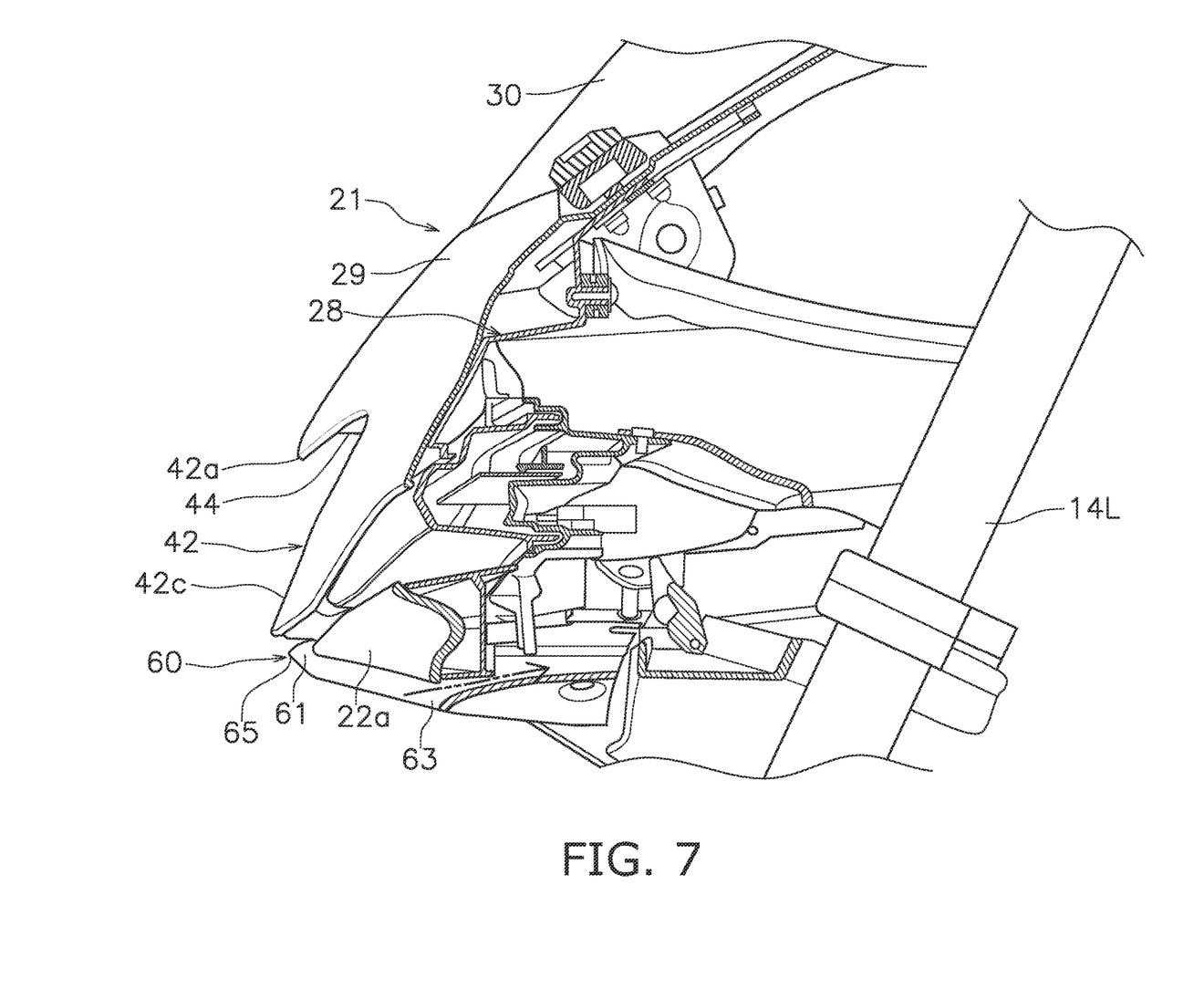
FIG. 7 is a cross-sectional view taken along line in FIG. 3.

FIG. 5 is a cross-sectional view taken along line V-V in FIG. 3. FIG. 6 is a cross-sectional view taken along line VI-VI in FIG. 3. FIG. 7 is a cross-sectional view taken along line VII-VII in FIG. 3. The upper end 42a has a shape slanted forward and downward. As shown in FIG. 3, the upper end 42a extends in approximately the right-and-left direction. The upper end 42a slants down to the inner side in the vehicle width direction in the vehicle front view. The upper end 42a is shaped such that a middle portion thereof protrudes down. The middle portion of the upper end 42a is disposed on a more front side than both ends of the upper end 42a.

The lower end 42b extends in the right-and-left direction. As shown in FIGS. 5 and 6, the lower end 42b is disposed on a more rear side than the upper end 42a. The left and right lateral ends 42c and 42d extend in approximately the up-and-down direction. As shown in FIGS. 3 and 4, in each left/right lateral end 42c, 42d, a lower portion thereof is disposed on a more front side than an upper portion thereof and is also disposed on a more inner side than the upper portion thereof in the vehicle width direction. The lower portion of each left/right lateral end 42c, 42d is disposed on a more front side than the upper end 42a. It should be noted that in the present preferred embodiment, the upper end 42a, the left lateral end 42c, and the right lateral end 42d are provided as portion of the outer cover 29 of the front cover 21, whereas the lower end 42b is provided as portion of the cover body 28 of the front cover 21.

The traveling wind pathway 43 extends rearward from the opening 42 and is opened rearward. In the present preferred embodiment, the traveling wind pathway 43 is provided in the cover body 28 of the front cover 21. The traveling wind pathway 43 is shaped to adjoin the opening 42. Because of this, the traveling wind, flowing from ahead of the vehicle, is taken in through the opening 42 and is led to rear of the vehicle through the traveling wind pathway 43.

The duct 40 includes an upper surface 44, a lower surface 45, a left lateral surface 46, and a right lateral surface 47. The upper surface 44, the lower surface 45, the left lateral surface 46, and the right lateral surface 47 are provided as portion of the cover body 28 and compose the traveling wind pathway 43. The upper surface 44 is disposed on an upper side than the upper end 42a of the opening 42. The front end of the lower surface 45 is disposed on a more rear side than the front end of the upper surface 44. The front end of the lower surface 45 is provided as the lower end 42b of the opening 42. The left and right lateral surfaces 46 and 47 extend to a more front side than the upper and lower surfaces 44 and 45. In each left/right lateral surface 46, 47, a lower portion thereof is disposed on a more inner side than an upper portion thereof in the vehicle width direction. In each left/right lateral surface 46, 47, a rear portion thereof is disposed on a more inner side than a front portion thereof in the vehicle width direction.

The headlight 50 is disposed inside the duct 40. As shown in FIG. 6, the headlight 50 is disposed apart from the upper surface 44 and the lower surface 45 at gaps in the up-and-down direction. As shown in FIG. 3, the headlight 50 is disposed apart from the left lateral surface 46 and the right lateral surface 47 at gaps in the right-and-left direction.

Figure 8:
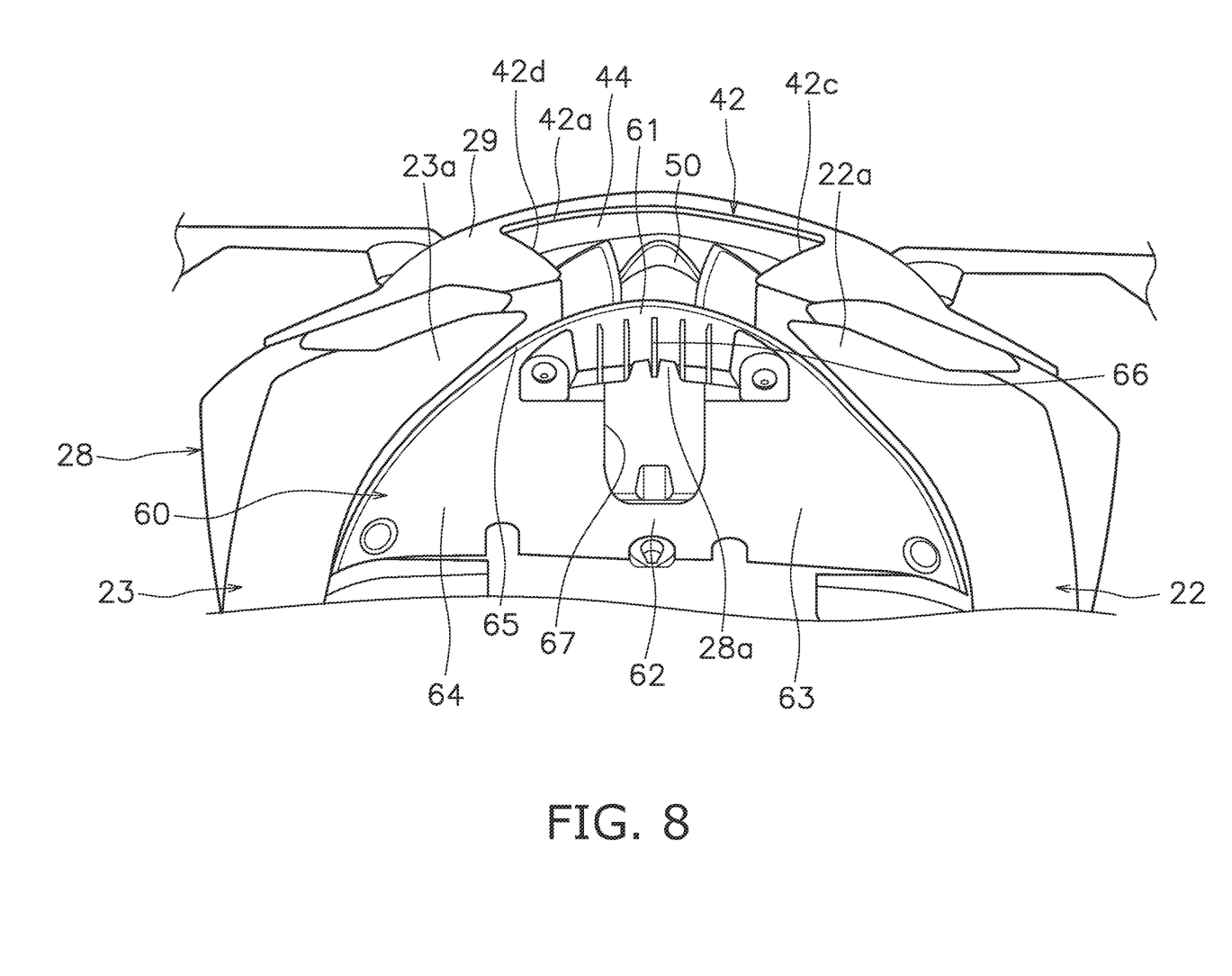
FIG. 8 is a perspective view of an aero-stabilizing member and the surroundings thereof seen from a front bottom side.

The aero-stabilizing member 60 generates a downforce by utilizing the traveling wind flowing from ahead. The aero-stabilizing member 60 is disposed directly below the front cover 21. The aero-stabilizing member 60 is attached to a lower portion of the cover body 28 of the front cover 21. FIG. 8 is a perspective view of the aero-stabilizing member 60 and the surroundings thereof as seen from front below. As shown in FIG. 8, the aero-stabilizing member 60 has an approximately semi-circular shape and the front side thereof has a circular-arc shape.

The aero-stabilizing member 60 is disposed directly below the front cover 21. In the vehicle front view, the aero-stabilizing member 60 overlaps the opening 42 and the traveling wind pathway 43 in the up-and-down direction. In the vehicle side view, the aero-stabilizing member 60 overlaps the opening 42 and the traveling wind pathway 43 in the up-and-down direction. The aero-stabilizing member 60 is disposed on a more rear side than a lower portion of each left/right lateral end 42c, 42d. The aero-stabilizing member 60 is disposed on a more front side than an axle 4a of the front wheel 4. The aero-stabilizing member 60 extends to more outer sides than the pair of right and left front suspensions 14R and 14L in the vehicle width direction. The aero-stabilizing member 60 is attached to the cover body 28 of the front cover 21 in detachable manner. In more detail, the aero-stabilizing member 60 is attached to the cover body 28 of the front cover 21 in detachable manner, while the front side covers 22 and 23 have been already attached to the cover body 28.

As shown in FIG. 8, the aero-stabilizing member 60 includes a middle portion 61, a rear portion 62, a left lateral portion 63, a right lateral portion 64, a front edge 65, at least one rib 66, and an insertion hole 67. The middle portion 61 is disposed in a lower portion of the distal end of the cover body 28 of the front cover 21, while being disposed directly below the opening 42 in the vehicle front view. The middle portion 61 protrudes to a more front side than the left and right lateral portions 63 and 64. The middle portion 61 is disposed on an upper side than the left and right lateral portions 63 and 64. The middle portion 61 is disposed on a more front side than the upper end 42a of the opening 42. The middle portion 61 is disposed on a more rear side than the left and right lateral ends 42c and 42d of the opening 42. The middle portion 61 is disposed in front of the lower end 42b of the opening 42. The middle portion 61 is disposed such that the rear end thereof adjoins the lower end 42b of the opening 42. The middle portion 61 is disposed such that the upper surface thereof adjoins the lower surface 45 of the duct 40.

The rear portion 62 is disposed behind the middle portion 61. The rear portion 62 is disposed such that the upper surface thereof adjoins the lower surface 45 of the duct 40.

The left lateral portion 63 extends to a more outer side than the opening 42 in the vehicle width direction. The left lateral portion 63 extends leftward from the middle portion 61 and the rear portion 62. The left lateral portion 63 is attached to the front cover 21 and the front side cover 22 in detachable manner. In the present preferred embodiment, for instance, the left lateral portion 63 is fixed at the front side thereof to the cover body 28 of the front cover 21 by fastening a bolt, while being fixed at the rear side thereof to the front side cover 22 by a resin rivet. The left lateral portion 63, except for the portion thereof fixed to the cover body 28 of the front cover 21, is disposed apart from the front cover 21 at a gap in the up-and-down direction. The left lateral portion 63 is disposed apart from the front end 22a of the front side cover 22 at a gap in the up-and-down direction.

It should be noted that the left lateral portion 63 may be attached to only the cover body 28 of the front cover 21 in detachable manner, or alternatively, may be attached to the cover body 28 of the front cover 21 by another attachment/detachment means.

The right lateral portion 64 is shaped to be bilaterally symmetric to the left lateral portion 63. The right lateral portion 64 extends to a more outer side than the opening 42 in the vehicle width direction. The right lateral portion 64 extends rightward from the middle portion 61 and the rear portion 62. The right lateral portion 64 is fixed to the front side cover 23 and the cover body 28 of the front cover 21 by attachable/detachable means similar to that for fixing the left lateral portion 63. The right lateral portion 64, except for the portion thereof fixed to the cover body 28 of the front cover 21, is disposed apart from the front cover 21 at a gap in the up-and-down direction. The right lateral portion 64 is disposed apart from the front end 23a of the front side cover 23 at a gap in the up-and-down direction.

The front edge 65 is partially disposed on a more front side than the lower end 42b of the opening 42. The front edge 65 is included in the middle portion 61, the left lateral portion 63, and the right lateral portion 64. In the present preferred embodiment, the front edge 65 is disposed on a more front side than the lower end 42b of the opening 42 at a portion located in the middle portion 61, a portion adjacent to the middle portion 61 in the left lateral portion 63, and a portion adjacent to the middle portion 61 in the right lateral portion 64. The front edge 65 is shaped to slant down forward.

The at least one rib 66 is provided on the lower surface of the middle portion 61. The at least one rib 66 protrudes downward from the lower surface of the middle portion 61. The at least one rib 66 has a plate shape and the thickness (depth) direction thereof corresponds to the right-and-left direction. In the present preferred embodiment, the aero-stabilizing member 60 includes a plurality of ribs 66. The plural ribs 66 are disposed apart from each other at intervals in the right-and-left direction.

The insertion hole 67 is a hole penetrating the aero-stabilizing member 60 in the up-and-down direction and is provided between the middle portion 61 and the rear portion 62. The front cover 21 includes an engaging portion 28a to be inserted into the insertion hole 67. The engaging portion 28a is provided on the cover body 28. The engaging portion 28a is shaped to be recessed from front to rear. The engaging portion 28a is engaged with one of the ribs 66, whereby the aero-stabilizing member 60 is positioned with respect to the front cover 21. When described in detail, the engaging portion 28a is inserted into the insertion hole 67 from above and is thereafter engaged with one of the ribs 66, whereby the aero-stabilizing member 60 is positioned with respect to the cover body 28 of the front cover 21. It should be noted that the rib 66, with which the engaging portion 28a is engaged, is the one located in the vehicle middle in the vehicle width direction among the plural ribs 66.

Figure 9:
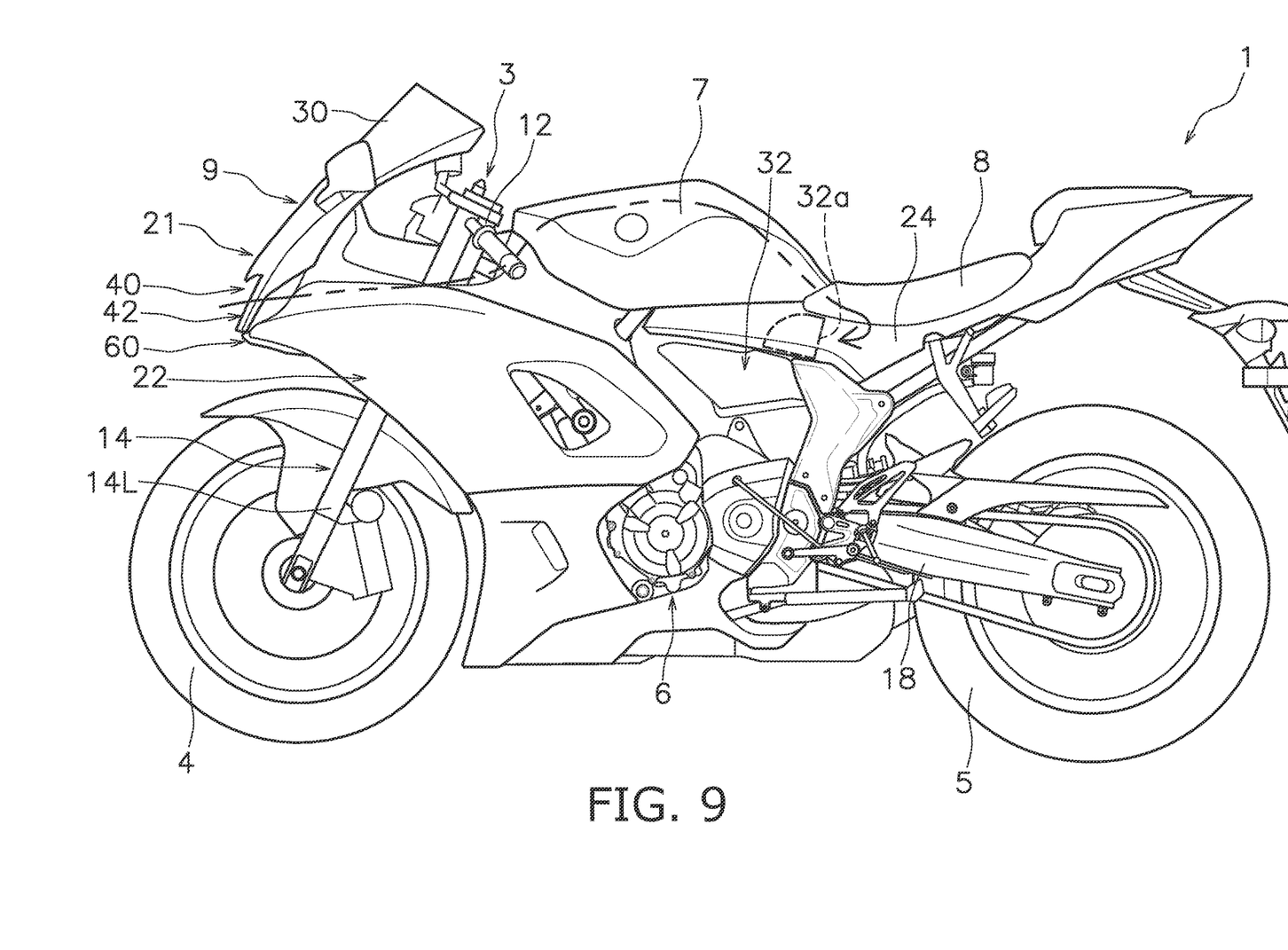
FIG. 9 is a diagram for explaining a flow of traveling wind.

Next, a flow of traveling wind taken in through the opening 42 into the duct 40 will be explained with reference to FIGS. 2 and 9. In FIGS. 2 and 9, the flow of traveling wind is depicted with dashed two-dotted line. As shown in FIG. 2, the traveling wind, taken in through the opening 42 into the duct 40, flows the lateral sides of the head pipe 12 and the tank support frame 13a and reaches the air intake port 32a. Besides, as shown in FIG. 9, the traveling wind, taken in through the opening 42 into the duct 40, flows the lateral sides of the head pipe 12, flows through a gap between a tank body and a tank cover (both of which are not shown in the drawings) of the fuel tank 7, and reaches the air intake port 32a. Furthermore, the traveling wind, flowing through gaps between the front cover 21 and the left and right lateral portions 63 and 64 of the aero-stabilizing member 60, is led to flow toward a radiator (not shown in the drawings) by the left and right lateral portions 63 and 64 of the aero-stabilizing member 60.

In the straddled vehicle 1 according to the present aspect, the front edge 65 of the aero-stabilizing member 60 is shaped to slant down forward. Therefore, the traveling wind flowing from ahead hits the aero-stabilizing member 60, whereby a downforce is generated. Because of this, the straddled vehicle 1 can obtain a downforce with a simple and compact configuration in comparison with, for instance, a configuration that a vehicle is provided with wing-shaped aero-stabilizing fins and/or so forth on lateral portions thereof so as to generate a downforce. Besides, the left and right lateral portions 63 and 64 of the aero-stabilizing member 60 are disposed apart from the front cover 21 at gaps in the vehicle up-and-down direction. Hence, the traveling wind hits the left and right lateral portions 63 and 64, whereby a downforce can be herein obtained as well. Moreover, the aero-stabilizing member 60 is configured to be disposed in a front portion of the vehicle, i.e., a position in which air pressure is high. Hence, a greater downforce can be herein obtained than a configuration that the aero-stabilizing member 60 is disposed in any other position. Furthermore, the front edge 65 of the aero-stabilizing member 60 is partially disposed on a more front side than the lower end 42b of the opening 42. Hence, the traveling wind is stabilized by the aero-stabilizing member 60 and becomes likely to be led to the opening 42. Consequently, the amount of wind passing through the duct 40 can be increased.

One preferred embodiment of the present invention has been explained above. However, the present invention is not limited to the preferred embodiment described above, and a variety of changes can be made without departing from the gist of the present invention.

In the preferred embodiment described above, the aero-stabilizing member 60 is attached to the front cover 21 in detachable manner. However, the aero-stabilizing member 60 may not be necessarily attached to the front cover 21 in detachable manner. Besides, the aero-stabilizing member 60 may be disposed on a more rear side than the axle 4a of the front wheel 4. In the preferred embodiment described above, the engaging portion 28a may be omitted, and furthermore or alternatively, the ribs 66 may be omitted.

What is claimed is:

1. A straddled vehicle comprising:
   a body frame including a head pipe;
   a front cover disposed in front of the head pipe;
   a duct disposed in front of the head pipe, the duct extending rearward from an opening formed in the front cover, to thereby form a traveling wind pathway for traveling wind flowing from ahead that is taken in through the opening; and
   an aero-stabilizing member configured to generate a downforce by utilizing the traveling wind flowing from ahead, the aero-stabilizing member including:
   a middle portion disposed below a lower distal end of the front cover, and directly below the opening in a front view of the straddled vehicle,
   a lateral portion extending from the middle portion to a more outer side of the straddled vehicle than the opening in a width direction of the straddled vehicle, the lateral portion being disposed apart from the front cover with a gap therebetween in an up-and-down direction of the straddled vehicle, and a front edge slanted forward and downward from the entire middle portion and the entire lateral portion, the front edge being partially disposed further forward than a lower front end of the duct in a forward-and-rearward direction of the straddled vehicle, an upper surface of the middle portion, an upper surface of the lateral portion and an upper surface of the front edge integrally forming a continuous upper surface of the aero-stabilizing member.

2. The straddled vehicle according to claim 1, wherein the aero-stabilizing member is attached to the front cover in a detachable manner.

3. The straddled vehicle according to claim 1, further comprising:

a front fork turnably supported by the head pipe; and a front wheel rotatably supported by the front fork, wherein the aero-stabilizing member is disposed further forward than an axle of the front wheel.

4. The straddled vehicle according to claim 1, wherein the lower front end of the duct is formed further rearward than an upper front end of the duct, and the middle portion of the aero-stabilizing member is disposed in front of the lower front end of the duct, a rear end of the middle portion adjoining the lower front end of the duct.

5. The straddled vehicle according to claim 1, wherein the middle portion protrudes to be further forward than the lateral portion, and has at least one rib on a lower surface thereof.

6. The straddled vehicle according to claim 5, wherein the front cover includes an engaging portion that is engageable with the at least one rib, so as to position the aero-stabilizing member with respect to the front cover.

* * * * *